United States Patent [19]

Yan

[11] 4,430,255
[45] Feb. 7, 1984

[54] NON-OHMIC DEVICE USING TIO$_2$

[75] Inventor: Man F. Yan, Berkeley Heights, N.J.

[73] Assignee: Bell Telephone Laboratories, Incorporated, Murray Hill, N.J.

[21] Appl. No.: 413,751

[22] Filed: Sep. 1, 1982

Related U.S. Application Data

[63] Continuation-in-part of Ser. No. 144,171, Apr. 25, 1980, abandoned.

[51] Int. Cl.$^3$ ............................................. H01B 1/02
[52] U.S. Cl. ................................. 252/512; 252/520; 338/20; 361/320; 361/321
[58] Field of Search ............... 252/520, 518, 512, 521; 338/20, 21; 144/171; 501/134, 135; 357/10, 11, 12, 13; 361/311, 313, 320, 321

[56] References Cited

U.S. PATENT DOCUMENTS

| | | | |
|---|---|---|---|
| 3,715,701 | 2/1973 | Uperman et al. | 252/520 |
| 3,856,567 | 12/1974 | Petha | 252/520 |
| 4,003,855 | 1/1977 | Wong | 252/518 |
| 4,038,217 | 7/1977 | Namba et al. | 252/518 |
| 4,086,189 | 9/1978 | Honda et al. | 252/521 |
| 4,160,748 | 7/1979 | Yodogawa et al. | 252/518 |
| 4,172,922 | 10/1979 | Merp et al. | 252/520 |
| 4,344,062 | 8/1982 | Sudoh et al. | 252/520 |

OTHER PUBLICATIONS

"Semiconductor Materials with Perovshite and Rutile Structures", Rusemor, C. et al., *Inorganic Chemistry Materials*, vol. 17, No. 8, pp. 1495-1996, 8-76.
J. Chemie Physique, 73, pp. 479-484, 1976.
Japanese Journal of Applied Physics 10, pp. 736-746.
Journal of Applied Physics 46, pp. 1332-1341, 3-75.

*Primary Examiner*—Josephine Barr
*Attorney, Agent, or Firm*—Richard D. Laumann

[57] ABSTRACT

An electrical device having a nonlinear current-voltage characteristic is described which uses TiO$_2$, a Group IIA element such as barium, calcium and strontium in an amount greater than 0.0 and generally less than approximately 1.0 mole percent, a Group VB element such as niobium in an amount generally less than 5.0 mole percent.

15 Claims, 5 Drawing Figures

NON-OHMIC DEVICE USING TIO₂

CROSS REFERENCE TO RELATED APPLICATION

This application is a continuation-in-part of my copending application, Ser. No. 144,171, filed Apr. 25, 1980 now abandoned.

TECHNICAL FIELD

This invention relates generally to non-ohmic devices and particularly to non-ohmic devices using metal oxides and such devices having high dielectric constants.

BACKGROUND OF THE INVENTION

In many materials and devices, the electric current is a linear function of the electric field. These materials and devices are conventionally termed ohmic and have an electrical resistance which is independent of the applied voltage. There are, however, many materials and devices in which the electrical current is a nonlinear function of the electric field. In these materials and devices, conventionally termed non-ohmic, the electrical resistance is a function of the applied voltage.

Non-ohmic devices are numerous and extensively used in modern technology and include such well known devices as p-n junction diodes, tunnel diodes and metal-semiconductor devices. One non-ohmic device that is widely used is a two-terminal semiconductor device that is commonly called a varistor (variable resistor). This device is useful in applications such as equalization of the direct current through a piece of electrical equipment for different applied voltages.

The current-voltage characteristics of varistors are conveniently represented by the equation $I=KV^\alpha$. In this equation, K is a proportionality constant which depends upon both the resistivity and the dimensions of the device, and $\alpha$ is an index of a nonlinearity of the current-voltage relationship and is itself usually a function of the current. If $\alpha$ is equal to 1 and independent of the current, the device is ohmic.

Several materials have been exploited in varistors. For example, varistors using silicon carbide (SiC) based material has been extensively used, particularly in telephone systems, to provide line equalization. That is, these varistors equalize the direct current from a central office to individual telephone units, typically within the customer's premises, located at different circuit path lengths. Silicon carbide devices are also used in telephone central offices to protect equipment such as switching systems.

Varistor devices based on silicon carbide, however, have several drawbacks. For example, it is rather difficult to incorporate the dopants that are essential for the desired varistor characteristics into the SiC grains. Furthermore, clay from natural sources is typically used as a binder and filler material and graphite is used as a reducing agent during a processing sequence. These additives present problems with respect to quality control. Additionally, an appropriate moisture content must be maintained in the samples prior to firing.

Recently, varistors using metal oxides have been developed. For example, see *Japanese Journal of Applied Physics* 10 pp. 736–746 (1971). In particular, zinc oxide (ZnO) ceramics with selected metal oxide additives have been described. It is currently believed by many persons in the art that the non-ohmic properties are caused by segregation of the additive oxides at the grain boundaries of the zinc oxide ceramics.

Zinc oxide devices, however, typically operate between 50 and 200 volts to produce the desired current-voltage characteristics. The voltage drop across each grain boundary in ZnO has been reported to be 2 to 3 volts, see *Journal of Applied Physics* 46(3), pp. 1332–1341 (1975). Thus, operation at less than 20 volts requires a structure which is less than 10 grains thick and mechanically weak.

For many purposes, low voltage operation with varistors having reasonable mechanical strength is desired.

Metal oxide compositions are also useful in other electrical devices, such as capacitors. Commercial ceramic capacitors are generally either disc, multilayer or barrier with the latter two types generally having the highest capacitance per unit volume. Multilayer ceramic capacitors have become very expensive in recent years because a significant quantity of precious metal, used as electrode material and placed between the ceramic layers, is required to make a multilayer device. As a result, barrier layer capacitors have become at least as competitive as multilayer capacitors for many applications.

The dielectric properties of barrier layer capacitors result from the insulating layers formed at the grain boundaries of semiconducting grains. These grains have a high conductivity and form a support for the grain boundary dielectric layers. Typical barrier layer capacitors require two firings. in the first, the ceramic is sintered at a high temperature in a reducing atmosphere to yield large grain sizes and high electrical conductivity. In the second, low melting oxides are deposited on the sintered ceramic and annealed in an oxidizing atmosphere at a lower temperature. The oxide coating melts and penetrates the grain boundaries. Upon cooling, the low melting oxides form a dielectric second phase at the grain boundaries. The capacitors have a high capacitance because the second phase has dimensions that are small with respect to the grain size.

An alternative method of forming the thin insulating layers uses solute segregation at the grain boundaries as previously described for varistors.

SUMMARY OF THE INVENTION

It has been found a device comprising TiO₂ and at least one additive which is at least one element selected from the group consisting of the elements of Group IIA of the Periodic Table and which is typically present in an amount greater than 0.0 and less than 1.0 mole percent has non-ohmic electrical characteristics. At least one element selected from the group consisting of the elements of Group VB of the Periodic Table may be present in an amount typically less than approximately 5.0 mole percent as a further additive. The Group VB element increases the device conductivity. In one preferred embodiment, the Group IIA element is barium. In another preferred embodiment, the device has barium and niobium, which is a Group VB element. Varistors with characteristics desirable for low voltage operation are obtained when barium is present in amounts within the range from 0.15 and 0.3 mole percent and niobium is present in amounts within the range from 0.1 to 0.8 mole percent. Devices having compositions within the included range are useful as ceramic capacitors. In one preferred embodiment, the Group IIA element is Ba and it is present in an amount between 0.1 and 1.0 mole percent and the Group VB element is Ta and it is present in an amount between 0.2 and 0.4 mole percent.

DETAILED DESCRIPTION

Figure 1:
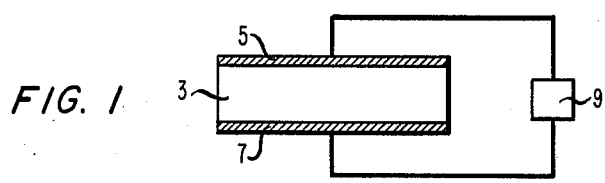
FIG. 1 is a schematic representation of a non-ohmic device of this invention.

FIG. 1 is a schematic representation of a device 1 of this invention. For reasons of clarity, the elements of the device are not drawn to scale. Device 1 has layer 3 which is contacted on opposing surfaces by electrical contacts 5 and 7. Layer 3 typically has a thickness between 0.015 and 0.040 inches although other dimensions may be used. Layer 3 typically has a diameter between 0.15 and 0.40 inches although other dimensions may be used. Contacts 5 and 7 are connected to an external circuit indicated generally by 9. The contacts or electrodes are conveniently fabricated from indium although titanium, copper, tin, lead, and gold could also be used. The electrodes are formed with conventional and well-known techniques.

Layer 3 comprises $TiO_2$ and at least one additive which is at least one element selected from the group consisting of the elements of Group IIA of the Periodic Table. The elements from Group IIA are present in an amount greater than 0.0 mole percent and generally less than 1.0 mole percent. Amounts greater than 1.0 mole percent are likely to lead to unwanted second phases. The preferred additives are the 2+ elements of Group IIA of the Periodic Table having an ionic radius greater than that of titanium. The term Group IIA means the elements Be, Mg, Ca, Sr and Ba. These additives include calcium, strontium and barium. The latter element has an ionic radius of approximately 1.35 Angstroms which is approximately 115 percent of the ionic radius of $Ti^{4+}$. In one preferred embodiment, the Group IIA element is barium and is present in an amount greater than 0.15 mole percent and less than or equal to 0.3 mole percent.

The Group IIA element forms a segregation layer at the grain boundaries. This layer acts as an electronic depletion layer or tunnel barrier. When the applied voltage exceeds a critical value, the electrons can tunnel through the barrier and the current increases rapidly. The element from Group IIA must have an ionic radius larger than titanium for a segregation layer to form. The ionic radius of titanium is approximately 0.7 Angstroms and barium, strontium and calcium, which have ionic radii of 1.35, 1.13, and 0.99 Angstroms, respectively, can form a segregation layer. Magnesium has an ionic radius of approximately 0.65 Angstroms and radially dissolves in the $TiO_2$ lattice.

If desired, the electrical conductivity of the device may be increased with the addition to layer 3 of another additive which is at least one element selected from the group consisting of the elements of Group VB of the Periodic Table present in the layer in an amount generally less than approximately 5.0 mole percent. Amounts greater than 5.0 mole percent are likely to lead to unwanted second phases. The term Group VB means the elements V, Nb, and Ta. These elements also produce non-ohmic characteristics in $TiO_2$ but are less effective in so doing than the elements selected from Group IIA. In another preferred embodiment, the additives are barium, as previously described, and niobium. The latter element is present in an amount between 0.3 and 0.8 mole percent.

The group VB element, which has a valence of 5+, decreases either the number of oxygen vacancies or the titanium interstitials and the electronic concentration increases as a result. Both tantalum and niobium have a stable 5+ valence and can significantly increase the electronic conductivity in $TiO_2$. However, because vanadium may have a valence of 2+, 3+, 4+ or 5+ and vanadium oxides have a relatively high vapor pressure, it is difficult to both control the vanadium valence and to process at high temperature. Vanadium is, therefore, less preferred as the Group VB element.

Suitable methods for fabricating the device will be described. The elements added to the $TiO_2$ in layer 3 are present in a relatively small amount and a homogeneous material should be used for layer 3. Anatase $TiO_2$ powder is mixed into an aqueous solution of barium nitrate and niobium oxalate. Other soluble barium and niobium compounds can be used. This solution is mixed in a blender until homogeneous. A period of 30 minutes usually is sufficient. Barium sulfate is then precipitated by the addition of ammonium sulfate and either niobium hydroxide or niobium oxide is precipitated by the addition of ammonium hydroxide. The precipitative agent should be added in an amount sufficient to precipitate all of the additives present. Other compounds that precipitate barium and niobium can be used. The $TiO_2$ slurry with the additive precipitates is then blended for a time, typically 15 minutes, sufficient to thoroughly mix the slurry. The slurry is then mixed with a binder, such as polyvinyl alcohol, commonly referred to as PVA, and a dispersant, such as ammonium citrate and spray dried. Sintering is then done in well known manner at a temperature between 1350 and 1440 degrees C. for a time between 2 and 16 hours. A cooling rate between 100 and 10,000 degrees C. per hour has been found to yield good results. This rate has been found adequate to permit grain boundary segregation. If cooling is too slow the additive will segregate and form a second phase. If cooling is too rapid, no segregation will occur. Further considerations regarding the sintering atmosphere will be discussed after an empirical varistor model is discussed.

This method eliminates the need for the usual calcination and ball milling steps. Although the method has been described with respect to barium and niobium additives to $TiO_2$, it is understood that the method is applicable to any other Group IIA element with or without the presence of any Group VB element. Other elements will be added in the form of soluble compounds and then precipitated as described for barium and niobium.

Alternatively, the conventional ceramic processing sequence consisting of mixing the powder components, either oxides or carbonates, ball-milling, calcining at an intermediate temperature for particle reaction, granulating the calcined powder by wet milling, adding a binder and dispersant and spray drying followed by pressing and sintering may be used. It has been found that the latter technique produces material that appears less homogeneous than material produced by the first technique.

It is believed that the device will be better understood if an empirical model describing the general features of non-ohmic or varistor characteristics in ceramics is first discussed. As is well known, ceramic materials have a granular structure. It is hypothesized by this empirical model that the contributions to the resistivity of the ceramic material by the grain boundaries and the grains may be separated. At low current levels, it is assumed by the model that the voltage is too low for electrons to tunnel through the energy barriers at grain boundaries. In this low voltage region, the grain boundary resistivity is much higher than the grain resistivity. At high current levels, however, it is further assumed by the model that the voltage is sufficiently high to permit electrons to tunnel through the energy barriers at the grain boundaries. In this high voltage region, the grain boundary resistivity is small with respect to the grain resistivity. Although both limiting regions may have linear current-voltage characteristics, in the transition region from the high resistivity limit at low currents to the low resistivity limit at high currents, there is a nonlinearity in the voltage-current characteristic. This nonlinearity may be represented by the expression $I = KV^\alpha$ with values of $\alpha$ that are greater than 1. The nonlinear region provides the typical range of working voltages for devices of this invention.

Figure 2:
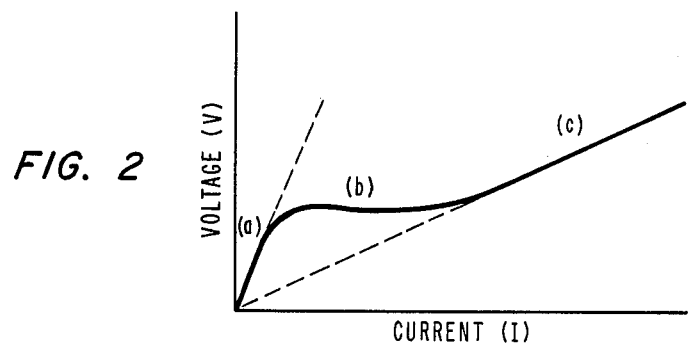
FIG. 2 plots the voltage, vertically, versus current, horizontally, characteristics of a device according to one empirical model of a varistor.

The voltage-current characteristic curve that results from this empirical model is depicted in FIG. 2 with voltage plotted vertically versus current plotted horizontally. Both the voltage and current are plotted in arbitrary units. The low current, high resistivity region, is indicated by (a) and the high current, low resistivity region is indicated by (c). The nonlinear transition region between the two limiting regions is indicated by (b) and provides the typical range of working voltages for varistor devices made according to this invention. This current-voltage characteristic curve is in qualitative agreement with that observed in both TiO$_2$ devices of this invention and prior art ZnO varistors.

Both niobium and barium additives in TiO$_2$ yield non-ohmic or varistor characteristics but barium, as explained previously, causes a more significant increase in the $\alpha$ value than does niobium. Devices without barium have been found to have an average value of approximately $\alpha = 1.8$ while devices with barium have been found to have $\alpha$ values that exceed 3.5, i.e., they exhibit greater nonlinearity. Barium is apparently the more effective additive, in terms of increasing the non-ohmic characteristics, because it undergoes grain boundary segregation and forms insulating layers at the grain boundaries. Auger analyses on fractured samples show that the barium concentration on grain boundaries is approximately 150 times higher than the barium concentration in the bulk. Niobium segregation is, however, not detected. These differences are explained by disparities in ionic sizes. The ionic size of Ba$^{2+}$ is approximately 115 percent larger than that of Ti$^{4+}$ while that of Nb$^{5+}$ is only 12 percent larger. Thus, Ba$^{2+}$ does not fit into the TiO$_2$ lattice while Nb$^{5+}$ does.

The sintering atmosphere has been found to have an effect on device properties. The $\alpha$ value increases as the oxygen partial pressure increases from 10$^{-5}$ to 1. An oxygen partial pressure at least equivalent to that found in the ambient atmosphere is required to yield an $\alpha$ value greater than approximately 3 for TiO$_2$ having 0.5 mole percent niobium and 0.2 mole percent barium. It is believed that higher oxygen partial pressures yield higher $\alpha$ values because of greater grain boundary oxidation and barium segregation at grain boundaries. However, as the oxygen partial pressure in the sintering atmosphere increases, the resistivity also increases. For example, samples sintered in an oxygen atmosphere have a resistivity approximately 10$^3$ times larger than samples sintered in a nitrogen atmosphere. It is believed that this happens because oxygen vacancies and titanium interstitials are produced in an inert and reducing atmosphere. These defects act as donors and increase the electronic concentration and thus the conductivity.

Figure 3:
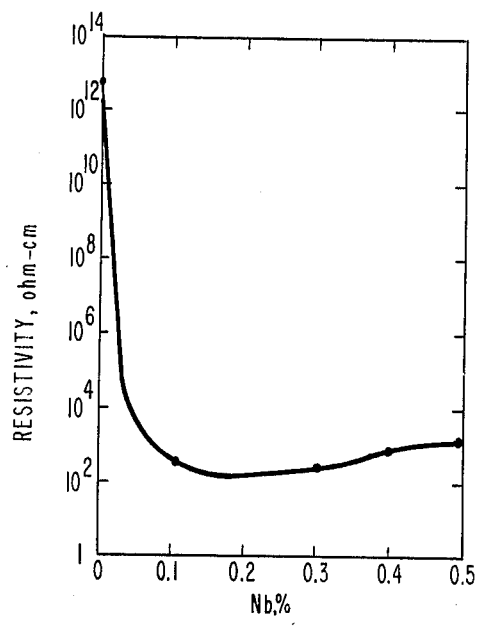
FIG. 3 plots the resistivity, vertically, versus niobium content, horizontally, in mole percent for several devices of this invention.

The resistivity, plotted vertically in ohm-cm, versus niobium content, plotted horizontally in units of mole percent, is shown in FIG. 3 for a device of this invention having 0.1 mole percent barium and varying amounts, as indicated, of niobium. The devices were made according to the preferred method discussed previously. The resistivity decreases rapidly as the niobium content rises from zero mole percent, reaches a minimum between 0.10 and 0.25 mole percent and then increases slowly above 0.25 mole percent. The sharp decrease in resistivity is caused by the increase of the electronic concentration due to the dissolution of niobium ions in the TiO$_2$ lattice. Defect reaction analysis shows that the electronic concentration equals the concentration of niobium ions in solid solution in TiO$_2$. The niobium concentration is larger than $3.2 \times 10^{19}$ per cubic centimeter. Without the niobium additive, the electronic concentration in TiO$_2$ is less than $3.2 \times 10^{10}$ per cubic centimeter. Thus, a small niobium concentration increases the electronic concentration by a factor of 10$^9$. Since the electrical conductivity is proportional to the electronic concentration, a significant decrease in the resistivity results from the niobium additive. The increase in resistivity above 0.25 mole percent is perhaps due to precipitation of excessive niobium into a second phase although this is not known with absolute certainty.

Figure 4:
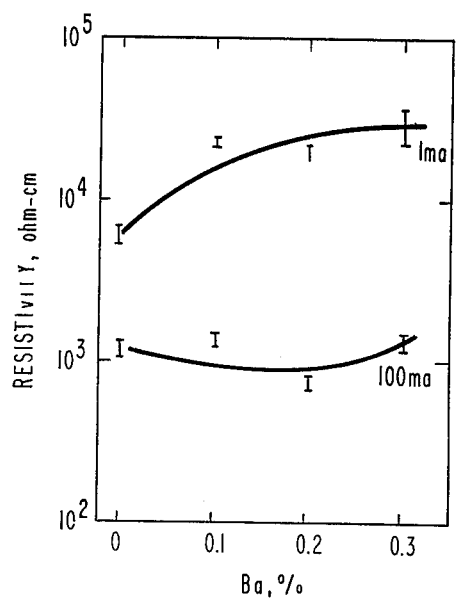
FIG. 4 plots the resistivity, vertically, versus barium content, horizontally, in mole percent for different currents in several devices of this invention.

The resistivity, plotted vertically in units of ohm-cm, versus barium content, plotted horizontally in units of mole percent, is shown in FIG. 4 at two current levels for devices of this invention having 0.5 mole percent niobium and varying barium content. The device was made according to the preferred method discussed previously. The changes in barium content have a relatively small effect on the resistivity as compared to the effects of the changes in niobium content at constant barium content as shown in FIG. 3.

The relatively constant resistivity is explained by the following model. From the defect model discussed by P. Kofstad in "Non-stoichiometry, Diffusion and Electrical Conductivity in Binary Metal Oxides" published by Wiley-Inter-Science, New York, 1972, it is anticipated that the barium will enter the cation lattice as a +2 ion and an electronic acceptor. Electrons from the niobium donors in these samples should be completely compensated by the 0.25 mole percent barium acceptors. Resistivities for the samples containing more than 0.25 mole percent barium should thus be significantly higher than those having a lesser amount of barium additive. However, the data in FIG. 4 do not agree with this argument. It is hypothesized that this is due to the fact that barium solubility in TiO$_2$ is relatively small because of the large differences in ionic sizes mentioned previously and that the barium segregates at grain boundaries as a result. Therefore, the effective barium dissolution in the titanium lattice is minimized and it does not appear to act effectively as an electronic acceptor.

Figure 5:
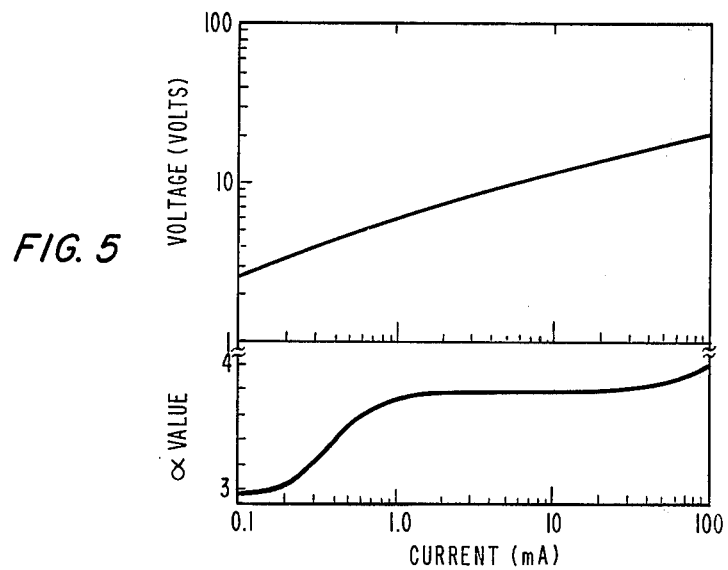
FIG. 5 plots the voltage and α values, vertically, versus the current, horizontally, for a device of this invention.

FIG. 5A plots voltage, vertically in volts, versus current, horizontally in mA, for a device having 0.5 mole percent niobium and 0.2 mole percent barium. FIG. 5B plots the α value, vertically, versus the current, horizontally in mA for the device of FIG. 5A. The TiO₂ layer had a diameter of 0.205 inches and a thickness of 0.024 inches. The α values are calculated from differentiation of the voltage-current characteristic shown in FIG. 5A. The value of α is a function of the current and as can be seen, gradually increases as the current increases.

The electrical characteristics of a device depend, in well known manner, upon the layer dimensions as well as the material parameters discussed. For example, if the layer thickness is increased, the applied voltage must be increased to maintain the same current level. However, the applied voltage may be decreased by increasing either the layer area or the electrode area.

Several compositions have been found especially useful for low voltage applications. For example, devices were made in which the direct current voltage required to pass 10 mA was between 8.9 and 10.7 volts and the direct current voltage required to pass 1 mA was a minimum of 4.7 volts. These devices have a value of α greater than 2.80. Devices which satisfy this criterion have a barium content greater than approximately 0.2 mole percent and less than approximately 0.3 mole percent and a niobium content greater than approximately 0.4 mole percent and less than approximately 0.7 mole percent.

Devices were also made in which the direct current required to pass 100 mA was between 7.2 and 8.7 volts and the direct current voltage required to pass 1 mA was a minimum of 1.6 volts. These devices have a value of α greater than 2.72. Devices which satisfy this criterion have a barium content greater than approximately 0.15 mole percent and less than approximately 0.3 mole percent and a niobium content greater than 0.35 mole percent and less than approximately 0.75 mole percent.

Other Group IIA elements yield varistor devices useful at other relatively low voltages. Sr is advantageously used in amounts between 0.1 and 0.3 mole percent. For example, a device having 0.2 mole percent Sr and 0.5 mole percent Nb had a value of a of 3.2 between 25 and 28 volts. A device having 0.2 mole percent Sr and 0.5 mole percent Ta had a value of α of 3.3 at 25 volts. Useful amounts of Ta are between 0.05 and 0.8 mole percent.

The disclosed compositions, because of the segregation layer, are also useful in electrical devices such as capacitors.

The effective dielectric constant, $K_{eff}$, is calculated from the measured capacitance, C, in units of nf, and the specimen diameter, D, and thickness, t, both in units of cm, by the relationship:

$$k_{eff} = 2228 t \, (C/D^2)$$

For compositions comprising TiO₂ and 0.2 to 0.4 mole percent Ta and 0.1 to 1.0 mole percent Ba, effective dielectric constants in the range from $10^4$ to $10^5$ were obtained at frequencies of $10^3$ and $10^4$ Hz. The dielectric loss, tan δ, is as low as 0.04 to 0.06 for TiO₂ further comprising 0.22 to 0.28 mole percent Ta and 0.3 to 0.9 mole percent Ba.

The dielectric loss is related to the nonlinearity index, α, in the V-I relation of $I = kV^\alpha$. Thus, the dielectric loss decreases with an increase in α.

The compositions disclosed that have a dielectric loss between 0.04 and 0.06 have a high nonlinearity index that is between about 5.5 and 6.0. The relationship between the dielectric loss and the nonlinearity index is easily understood. The dielectric loss is due to a finite resistivity of the grain boundary dielectric layers. The dielectric loss decreases with an increase in the grain-boundary resistivity. As previously discussed the nonlinear electrical properties of TiO₂ ceramics are due to the segregated insulating layers formed at the boundaries of the grains. Thus, an increase in the grain-boundary resistivity also leads to a higher α value. Accordingly, the observed decrease in the dielectric loss as the nonlinearity index increases is consistent with the varistor models discussed. The dielectric constant measured in doped TiO₂ ceramics is about 500 times higher than that measured in TiO₂ single crystals although lower than that in BaTiO₃ multilayer capacitors.

What is claimed is:

1. A device comprising a layer, said layer comprising TiO₂ and at least two additives; and
   two electrical contacts to said layer;
   characterized in that
   a first said additive is at least one element selected from the group consisting of elements of Group IIA of the Periodic Table, said first additive being present in an amount greater than 0.0 mole percent and less than 1.0 mole percent and a second said additive is at least one element selected from the group consisting of elements of Group VB of the Periodic Table, said second additive being present in an amount greater than 0.0 mole percent and less than 5.0 mole percent; said device being a nonohmic device or a ceramic capacitor.

2. A device as recited in claim 1 in which said element selected from Group IIA is barium.

3. A device as recited in claim 2 in which said layer comprises between 0.15 and 0.3 mole percent barium.

4. A device as recited in claim 1 or 3 in which said element selected from Group VB is niobium.

5. A device as recited in claim 4 in which said layer comprises between 0.3 and 0.8 mole percent niobium.

6. A device as recited in claim 1 in which said element selected from Group IIA is strontium, said strontium being present in an amount between 0.1 and 0.3 mole percent.

7. A device as recited in claim 6 in which said element selected from Group VB is tantalum.

8. A device as recited in claim 7 in which said device comprises between 0.05 and 0.8 mole percent tantalum.

9. A device as recited in claim 6 in which said element from Group VB is niobium.

10. A device as recited in claim 9 in which said layer comprises 0.35 to 0.75 mole percent niobium.

11. A device as recited in claim 2 in which said layer comprises 0.1 to 1.0 mole percent barium.

12. A device as recited in claim 11 in which said element selected from Group VB is tantalum.

13. A device as recited in claim 12 in which said layer comprises 0.2 to 0.4 mole percent tantalum.

14. A device as recited in claim 12 in which said layer comprises 0.3 to 0.9 mole percent barium.

15. A device as recited in claim 14 in which said layer comprises 0.22 to 0.28 mole percent tantalum.

* * * * *